United States Patent [19]
Whitehead

[11] Patent Number: 5,661,839
[45] Date of Patent: Aug. 26, 1997

[54] LIGHT GUIDE EMPLOYING MULTILAYER OPTICAL FILM

[75] Inventor: Lorne A. Whitehead, Vancouver, Canada

[73] Assignee: The University of British Columbia, Vancouver, Canada

[21] Appl. No.: 620,885

[22] Filed: Mar. 22, 1996

[51] Int. Cl.$^6$ ........................................... G02B 6/10
[52] U.S. Cl. .................. 385/131; 385/130; 385/132; 385/901; 362/32
[58] Field of Search ........................... 385/131, 130, 385/132, 133, 901; 362/32, 31, 307

[56] References Cited

U.S. PATENT DOCUMENTS

| | | | |
|---|---|---|---|
| Re. 34,605 | 5/1994 | Schrenk et al. | 359/359 |
| 3,535,016 | 10/1970 | Malifaud | 350/96 |
| 3,610,729 | 10/1971 | Rogers | 350/157 |

(List continued on next page.)

FOREIGN PATENT DOCUMENTS

| | | | |
|---|---|---|---|
| 1327286 | 3/1994 | Canada | G02B 006/00 |
| 0 062 751 A1 | 10/1982 | European Pat. Off. | G02B 1/08 |
| 0167721 | 1/1986 | European Pat. Off. | |
| 0 426 636 A2 | 5/1991 | European Pat. Off. | B32B 7/02 |
| 0 469 732 A3 | 2/1992 | European Pat. Off. | G02B 1/04 |
| 0 514 223 A1 | 11/1992 | European Pat. Off. | G02B 5/08 |
| 5-288910 | 11/1993 | Japan | G02B 5/18 |
| 6-11607 | 1/1994 | Japan | G02B 5/18 |
| 713529 | 8/1954 | United Kingdom . | |
| 2196100 | 4/1988 | United Kingdom . | |
| WO 90/04132 | 4/1990 | WIPO . | |
| 91/09719 | 7/1991 | WIPO | B29C 43/20 |
| 95/17303 | 6/1995 | WIPO | B32B 7/02 |
| 95/17691 | 6/1995 | WIPO | G02B 5/30 |
| 95/17692 | 6/1995 | WIPO | G02B 5/30 |
| 95/17699 | 6/1995 | WIPO | G02F 1/1335 |

OTHER PUBLICATIONS

"Coextruded Elastometric Optical Interference Film," by W. Schrenk and J. Wheatley of the Dow Chemical Company in *ANTEC '88*, pp. 1703–1707 No Month.

"Coextruded Infrared Reflecting Films," W. J. Schrenk, R. A. Lewis, J. A. Wheatley, and C. B. Arends of the Dow Chemical Company, pp. 222 and 223 No Month No Year.

"Coextruded Iridescent Film," by Walter J. Schrenk, The Dow Chemical Company and Jules Pinsky, The Mearl Corporation, presented at the *1976 Paper Synthetics Conference*, on Sep. 27–29, 1976, in Atlanta, Georgia, pp. 141–145.

"Coextruded Microlayer Film and Sheet," by J. Im and W. J. Schrenk of The Dow Chemical Co. in *Journal of Plastic Film & Sheeting*, vol. 4, Apr. 1988, pp. 104–115.

"Coextruded Multilayer Polymer Films and Sheets," by W. J. Schrenk and T. Alfrey, Jr. of The Dow Chemical Company in *Polymer Blends*, vol. 2, (Academic Press, New York 1978), Chapter 15, pp. 129–165 no month.

"Effective Principal Refractive Indices and Column Angles for Periodic Stacks of Thin Birefringent Films," by Ian Hoddgkinson, of the Univ. of Otago, New Zealand and Qi Hong Wu of Zhejiang Univ., China, in *Journal of Optical Society of America*, vol. 10, No. 9, Sep. 1993, pp. 2065–2071.

(List continued on next page.)

*Primary Examiner*—Phan T. H. Palmer
*Attorney, Agent, or Firm*—Oyen Wiggs Green & Mutala

[57] ABSTRACT

A light guide having a non-light emitting portion made up of multiple layers of first and second substantially non-absorptive longitudinally specular light reflector materials. The index of refraction of each layer differs from the indices of refraction of the immediately adjacent layers, such that the layers collectively have high longitudinally specular reflectivity. The light guide also has a light emitting portion made of prism light guide wall material. A substantially non-absorptive light scattering mechanism is positioned within the non-light emitting portion in opposition to the light emitting portion.

21 Claims, 5 Drawing Sheets

U.S. PATENT DOCUMENTS

| | | | |
|---|---|---|---|
| 3,647,612 | 3/1972 | Schrenk et al. | 161/165 |
| 3,711,176 | 1/1973 | Alfrey, Jr. et al. | 350/1 |
| 3,759,647 | 9/1973 | Schrenk et al. | 425/131 |
| 3,773,882 | 11/1973 | Schrenk | 264/171 |
| 3,801,429 | 4/1974 | Schrenk et al. | 161/181 |
| 4,094,947 | 6/1978 | Alfrey, Jr. et al. | 264/171 |
| 4,105,293 | 8/1978 | Aizenberg et al. | 350/264 |
| 4,260,220 | 4/1981 | Whitehead | 350/96.28 |
| 4,310,584 | 1/1982 | Cooper et al. | 428/212 |
| 4,335,421 | 6/1982 | Modia et al. | 362/223 |
| 4,337,759 | 7/1982 | Popovich et al. | 126/438 |
| 4,446,305 | 5/1984 | Rogers et al. | 528/348 |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,540,623 | 9/1985 | Im et al. | 428/220 |
| 4,615,579 | 10/1986 | Whitehead | 350/96.1 |
| 4,750,798 | 6/1988 | Whitehead | 350/96.1 |
| 4,755,921 | 7/1988 | Nelson | 362/307 |
| 4,787,708 | 11/1988 | Whitehead | 350/96.2 |
| 4,791,540 | 12/1988 | Dreyer, Jr. et al. | 362/331 |
| 4,799,137 | 1/1989 | Aho | 362/309 |
| 4,805,984 | 2/1989 | Cobb, Jr. | 350/96.28 |
| 4,813,765 | 3/1989 | Negishi | 350/386 |
| 4,834,495 | 5/1989 | Whitehead et al. | 350/96.28 |
| 4,850,665 | 7/1989 | Whitehead | 350/96.1 |
| 4,874,228 | 10/1989 | Aho et al. | 350/345 |
| 4,906,070 | 3/1990 | Cobb, Jr. | 350/286 |
| 4,937,134 | 6/1990 | Schrenk et al. | 428/213 |
| 4,937,716 | 6/1990 | Whitehead | 362/268 |
| 4,984,144 | 1/1991 | Cobb, Jr. et al. | 362/339 |
| 4,989,125 | 1/1991 | Cobb, Jr. et al. | 362/346 |
| 4,996,632 | 2/1991 | Aikens | 362/32 |
| 5,016,143 | 5/1991 | Aikens | 362/32 |
| 5,043,850 | 8/1991 | Dreyer, Jr. | 362/26 |
| 5,089,318 | 2/1992 | Shetty et al. | 428/212 |
| 5,094,793 | 3/1992 | Schrenk et al. | 264/171 |
| 5,095,210 | 3/1992 | Wheatley et al. | 250/339 |
| 5,103,337 | 4/1992 | Schrenk et al. | 359/359 |
| 5,122,905 | 6/1992 | Wheatley et al. | 359/586 |
| 5,122,906 | 6/1992 | Wheatley | 359/586 |
| 5,126,880 | 6/1992 | Wheatley et al. | 359/587 |
| 5,149,578 | 9/1992 | Wheatley et al. | 428/213 |
| 5,186,530 | 2/1993 | Whitehead | 362/31 |
| 5,202,074 | 4/1993 | Schrenk et al. | 264/241 |
| 5,217,794 | 6/1993 | Schrenk | 428/220 |
| 5,233,465 | 8/1993 | Wheatley et al. | 359/359 |
| 5,234,729 | 8/1993 | Wheatley et al. | 428/30 |
| 5,243,506 | 9/1993 | Whitehead | 362/307 |
| 5,269,995 | 12/1993 | Ramanathan et al. | 264/171 |
| 5,278,594 | 1/1994 | Wheatley et al. | 359/359 |
| 5,309,544 | 5/1994 | Saxe | 385/146 |
| 5,316,703 | 5/1994 | Schrenk | 264/1.3 |
| 5,339,198 | 8/1994 | Wheatley et al. | 359/359 |
| 5,339,382 | 8/1994 | Whitehead | 385/146 |
| 5,360,659 | 11/1994 | Arends et al. | 428/216 |
| 5,389,324 | 2/1995 | Lewis et al. | 264/171 |
| 5,424,119 | 6/1995 | Phillips et al. | 428/328 |
| 5,448,404 | 9/1995 | Schrenk et al. | 359/584 |
| 5,451,449 | 9/1995 | Shetty et al. | 428/195 |
| 5,481,445 | 1/1996 | Sitzema et al. | 362/308 |
| 5,481,637 | 1/1996 | Whitehead | 385/125 |
| 5,486,949 | 1/1996 | Schrenk et al. | 359/498 |
| 5,540,978 | 7/1996 | Schrenk | 428/212 |
| 5,552,927 | 9/1996 | Wheatly et al. | 359/359 |
| 5,568,316 | 10/1996 | Schrenk et al. | 359/584 |

OTHER PUBLICATIONS

"Interfacial Flow Instability in Multilayer Coextrusion," by W. J. Schrenk, N. L. Bradley, T. Alfrey, Jr. of Dow Chemical Company and H. Maack of Dow Chemical Europe in *Polymer Engineering and Science*, Jun. 1978, vol. 18, No. 8, pp. 620–623.

"New Developments in Coextrusion" (Synopsis) by Walter J. Schrenk of The Dow Chemical Company, presented at the *International Conference on Advances in Polymer Processing*, New Orleans, LA, Apr. 2–4, 1991, pp. 1–10.

"Physical Optics of Iridescent Multilayered Plastic Films," by T. Alfrey, Jr., E. F. Gurnee, and W. J. Schrenk of Dow Chemical Company in *Polymer Engineering and Science*, Nov. 1969, vol. 9, No. 6, pp. 400–404.

"Reflectivity of Iridescent Coextruded Multilayered Plastic Films," by J. A. Radford, T. Alfrey, Jr. And W. J. Schrenk of The Dow Chemical Company in *Polymer Engineering and Science*, May 1973, vol. 13, No. 3, pp. 216–221.

*Thin–Film Optical Filters* by H. A. Maclead, of Sir Howard Grubb, Parsons & Co. Ltd., (Adam Hilger Ltd: London 1969), pp. ix–x no month.

LIGHT GUIDE EMPLOYING MULTILAYER OPTICAL FILM

FIELD OF THE INVENTION

This application is directed to a light guide in which a highly reflective multilayer optical film is used to obtain efficient, uniform emission of diffuse light.

BACKGROUND OF THE INVENTION

The prior art has evolved a variety of light guides which are capable of distributing light along the light guide for controlled emission at one or more regions remote from the light source. U.S. Pat. No. 4,750,798 exemplifies one such prior art light guide.

Such prior art light guides have predominantly reflective interior surfaces. Accordingly, light rays entering one end of the guide are reflected by the guide's inner walls as the rays proceed to the other end of the guide. In many lighting applications, the light guide is designed to "leak" light in a controlled manner, such that the amount of light emitted from the guide per unit length is acceptably uniform along the entire length of the guide, or along the entire length of each of the light guide's light emitting regions.

U.S. Pat. No. 4,984,144 (Cobb, Jr. et al) discloses a prismatic refractive optical lighting film (hereafter "prism light guide wall material") available from 3M, Inc. as "optical lighting film" under product nos. 2300 or 2301, which has been used to form a variety of prior art light guides. A common objective of such prior art guides is to distribute light from a point source over an area, to efficiently uniformly illuminate the area. Generally, the objective is to maximize the efficiency with which light is distributed along and emitted from the guide, while minimizing glare. Light guides formed of prism light guide wall material can emit light uniformly and diffusely over large areas with low glare relative to the level of illumination. Such guides are fabricated relatively easily and inexpensively, fulfilling a useful role.

In popular types of such prior art light guides the prism light guide wall material typically forms a tubular conduit. An extraction mechanism is provided inside the conduit. Light rays which enter the conduit from a light source are ordinarily internally reflected by the wall material and guided along the conduit. But, certain light rays which encounter the extraction mechanism are reflected in such a way that they are able to escape through the prism light guide wall material. However, light guides of this type are relatively inefficient in extracting diffuse light from the guide. This is because the light rays are typically reflected a number of times by a reflective cover outside the prism light guide wall material before they are emitted from the desired light emitting portion of the guide. In light guides constructed with currently available materials, each such reflection results in an absorption loss of about 5% to 10%. The net result is that about 25% of the available light is lost to absorption, instead of being emitted from the guide. In other words, the extraction efficiency of prior art light guides formed of prism light guide wall material is only about 75%.

The extraction efficiency of a light guide formed of prism light guide wall material can be improved by using an alternative technique to extract light from the guide. In particular, instead of providing an extraction mechanism inside the prism light guide wall material, a number of holes are provided in the wall material over the region from which light is to be extracted from the guide, or the wall material is otherwise modified in that region. With this design, light rays which escape from the light guide generally undergo fewer reflections before escaping, so the overall extraction efficiency is higher. Typically, only about 5% of the extracted light is lost to absorption, so the extraction efficiency is about 95%, which compares favourably to the 75% value in the previous example. A further advantage is that in some cases it is desirable that the escaping light be highly directional, as in the illumination of very high narrow architectural spaces. Such directionality is readily achieved with this alternative extraction technique.

Despite the advantages of the foregoing alternative extraction technique it has not become popular, for two reasons. First, light guides constructed in accordance with this technique are generally considered to be less visually attractive. For example, the light emitting surface is perceived as having a non-uniform distribution of light intensity, and as being too bright in some places. Second, it is much more difficult to design and manufacture light guides which employ the alternative extraction technique. Prototyping such designs typically involves an iterative procedure in which a substantial amount of valuable prism light guide wall material is unavoidably destroyed. Manufacturing such designs requires complex patterning technology to yield the optimal distribution of extraction effect over the surface of the prism light guide wall material.

The present invention overcomes the foregoing problems by exploiting the properties of newly discovered multilayer optical film materials.

SUMMARY OF THE INVENTION

In accordance with the preferred embodiment, the invention provides a light guide having a non-light emitting portion made up of multiple layers of first and second substantially non-absorptive longitudinally specular light reflector materials. The index of refraction of each layer differs from the indices of refraction of the immediately adjacent layers, such that the layers collectively have high longitudinally specular reflectivity. The light guide also has a light emitting portion comprising prism light guide wall material. A substantially non-absorptive light scattering mechanism is positioned within the non-light emitting portion in opposition to the light emitting portion.

The multiple-layered materials which make up the non-light emitting portion of the light guide may alternatively be such that each layer has a stress induced birefringence, with the layers collectively being birefringent over a range of uniaxial to biaxial orientation of the layers and having a collectively high longitudinally specular reflectivity. As another alternative, the layered materials may be first and second substantially non-absorptive polymers which differ in composition such that the layers collectively have high longitudinally specular reflectivity.

The light guide's cross-section can be substantially constant, or its cross-section may decrease along the guide. In either case, the width of the light scattering mechanism may be increased as a function of length along the light guide.

Advantageously, a low absorption lens may be positioned outside the light guide's light emitting portion. The light transmissivity characteristic of the lens may vary as a function of wavelength, polarization, angle, or a combination thereof.

DETAILED DESCRIPTION OF THE PREFERRED EMBODIMENT

Prior Art Background

Figure 1:
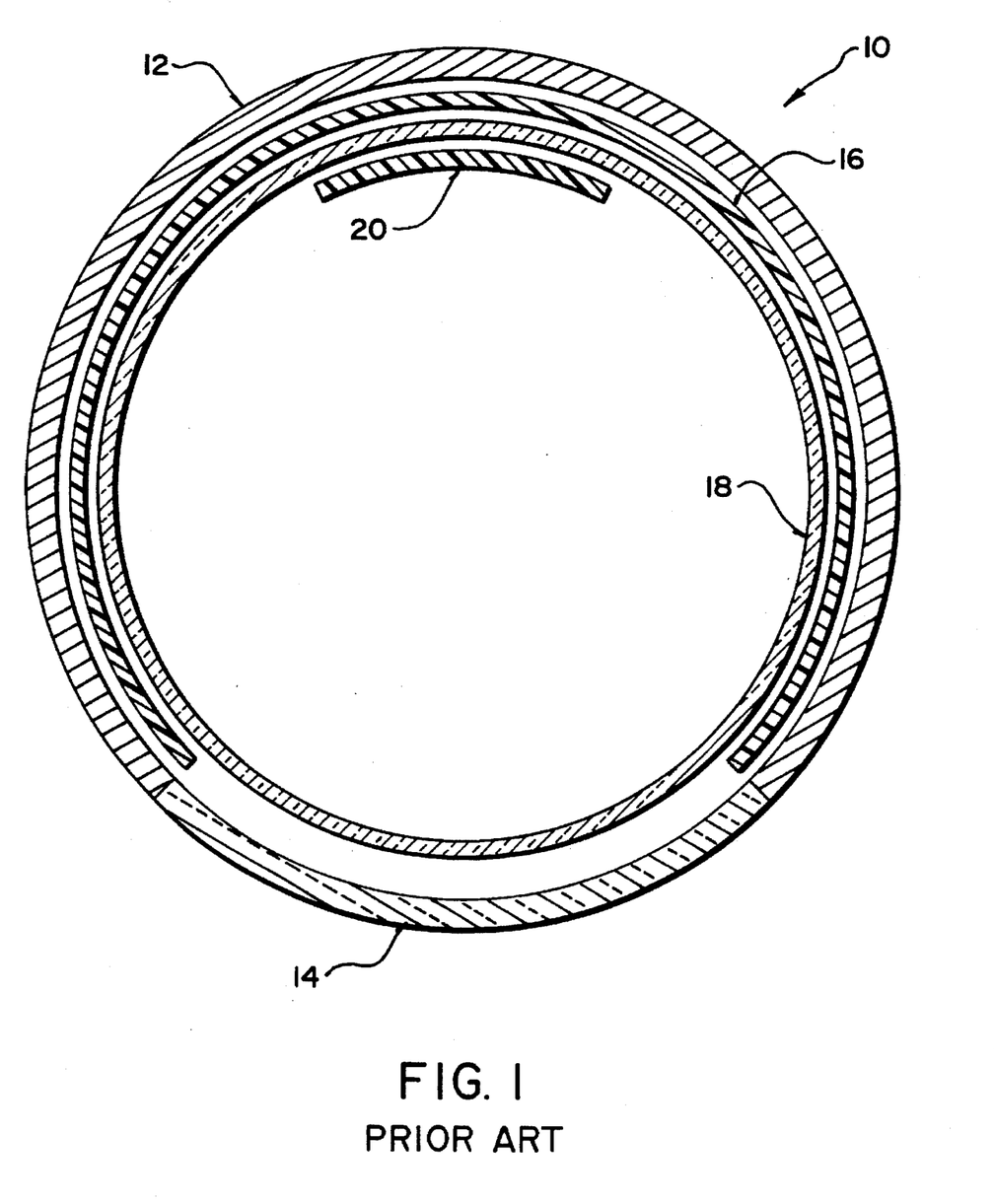
FIG. 1 is a schematic cross-sectional illustration of a prior art light guide formed of prism light guide wall material and containing a light extraction mechanism.

FIG. 1 is a schematic cross section of a typical prior art light guide 10 formed of prism light guide wall material. An outer cover having an upper, typically opaque portion 12 and a lower translucent portion 14 protects internal components of light guide 10. A white reflective film 16 is provided immediately inside opaque cover portion 12 to reflect light propagated along guide 10 which would otherwise strike opaque cover portion 12. A tubular conduit 18 formed of prism light guide wall material is provided inside film 16, to guide light emitted from a light source (not shown) longitudinally along light guide 10. A section of white extractor film 20 is provided inside conduit 18, near the top portion thereof. Extractor film 20 scatters light rays reflected onto it, causing them to escape through conduit 18 for emission through translucent cover portion 14.

In general, the width of extractor film 20 varies as a function of distance along light guide 10, in order to yield a light output which is reasonably uniform along the length of guide 10, notwithstanding the fact that the amount of light inside conduit 18 changes substantially as a function of distance along guide 10. Persons skilled in the art are readily able to customize the width variation of extractor film 20 for a particular light guide in order to attain the desired uniform light output.

The dimensions of the light guide components illustrated in FIG. 1 may vary significantly from one application to another in order to accommodate design objectives such as the desired length of guide 10, the nature of the light source, and the desired light output pattern. The guide's cross-sectional shape need not be round; a variety of shapes such as ovals and rectangles are commonly used.

The following general description characterizes all such light guides formed of prism light guide wall material, of which FIG. 1 is exemplary. Light entering one end of conduit 18 is guided toward the opposed end, where the light encounters an end mirror (not shown) which reflects the light back toward its source. As the light is guided to the end mirror and back, almost all of the light escapes from guide 10, due to the scattering effect of extractor film 20. More particularly, each light ray is internally reflected by conduit 18 until the ray encounters extractor 20. Most rays incident upon extractor 20 are scattered in directions to which conduit 18 is substantially transparent, allowing such rays to escape through conduit 18. As explained above, light guides of this type are relatively inefficient in extracting diffuse light from the guide, due to absorption losses which occur as the light rays undergo multiple reflections against white reflective film 16 prior to emission from guide 10.

Figure 2:
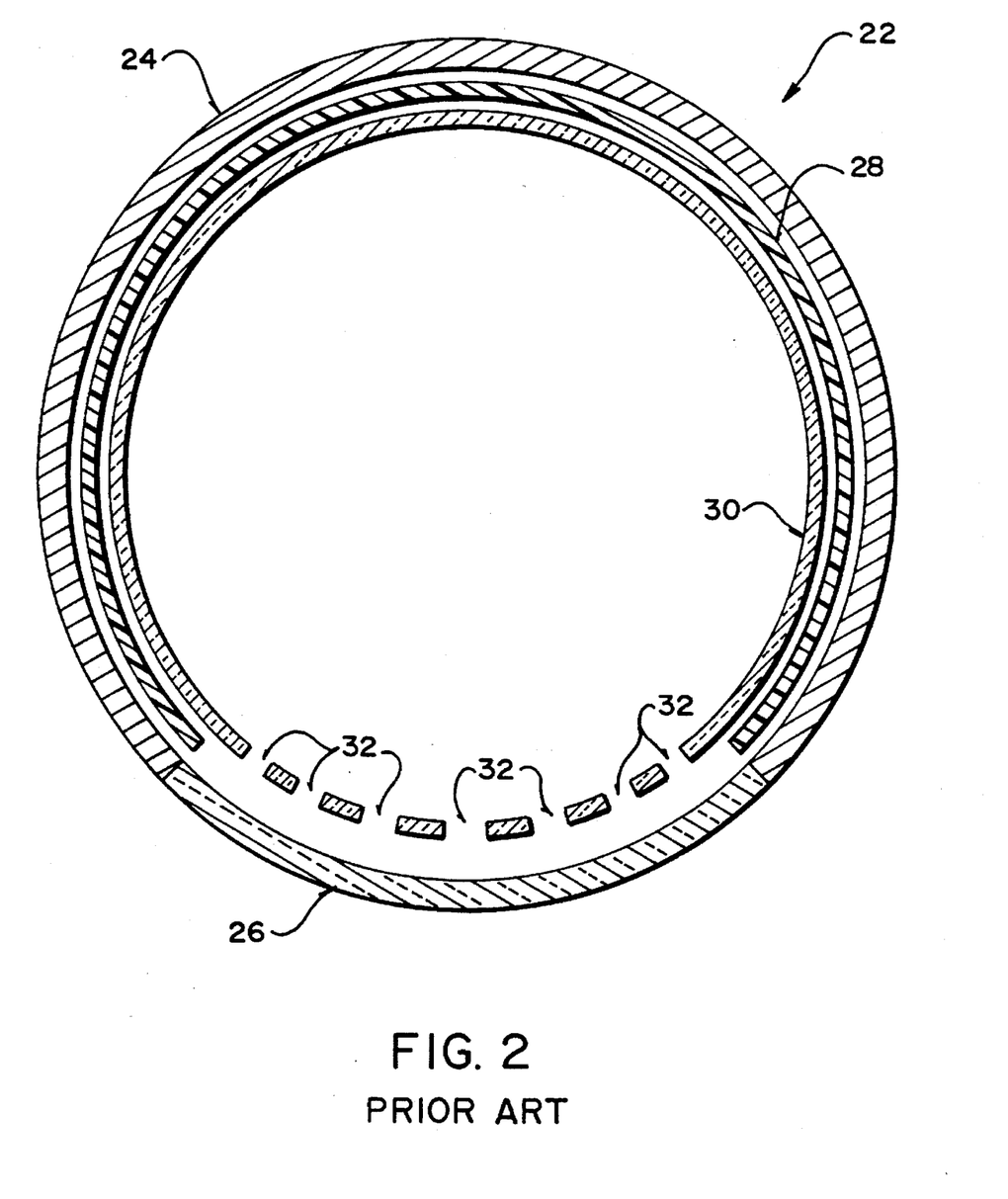
FIG. 2 is a schematic cross-sectional illustration of a prior art light guide formed of prism light guide wall material in which a number of holes are provided in the wall material over the region from which light is to be extracted.

FIG. 2 illustrates the aforementioned prior art technique for improving the extraction efficiency of a light guide formed of prism light guide wall material. As in the case of light guide 10, light guide 22 (FIG. 2) has a protective outer cover with an upper opaque portion 24 and a lower translucent portion 26; a white reflective film 28; and a tubular conduit 30 formed of prism light guide wall material. A series of light extraction holes 32 are provided in conduit 30 over the region from which light is to be extracted from guide 22. Light rays which escape from guide 22 through holes 32 generally undergo fewer internal reflections before escaping, so the extraction efficiency of guide 22 is generally better than that of guide 10, as explained above.

Multilayer Optical Film

In order to assist those skilled in the art in understanding the benefits attainable by constructing a light guide with a multilayer optical film a brief explanation of such films is now provided. The advantages, characteristics and manufacturing of such films are most completely described in U.S. patent application Ser. No. 08/402,041 filed Mar. 10, 1995 titled "Optical Film", which is incorporated herein by reference. Multilayer optical film is useful, for example, as highly efficient mirrors and/or polarizers. A relatively brief description of the properties and characteristics of multilayer optical film is presented below, followed by a description of an illustrative embodiment of a light guide employing multilayer optical film in accordance with the present invention.

Figure 3:
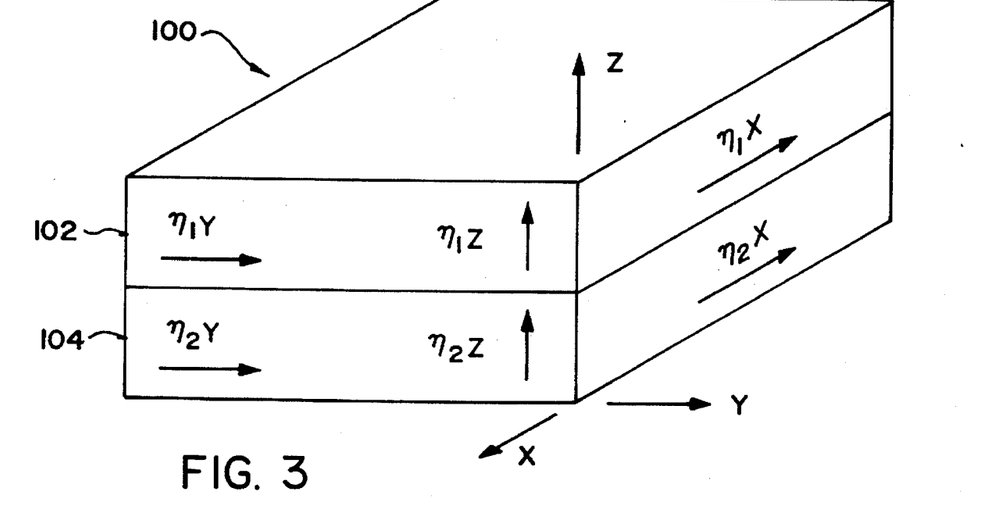
FIG. 3 is a schematic oblique perspective illustration, on a greatly magnified scale, of two layers of a multilayer optical film material.

FIG. 3 shows two layers of a multilayer stack 100, and indicates the three dimensional indices of refraction for each layer. The indices of refraction for each layer are $\eta_1 x$, $\eta_1 y$, and $\eta_1 z$ for layer 102, and $\eta_2 x$, $\eta_2 y$, and $\eta_2 z$ for layer 104. The relationships between the indices of refraction in each film layer to each other and to those of the other layers in the film stack determine the reflectance behaviour of the multilayer stack at any angle of incidence, from any azimuthal direction. The principles and design considerations described in U.S. patent application Ser. No. 08/402,041 can be applied to create multilayer stacks having the desired optical effects for a wide variety of circumstances and applications. The indices of refraction of the layers in the multilayer stack can be manipulated and tailored to produce the desired optical properties.

Figure 4:
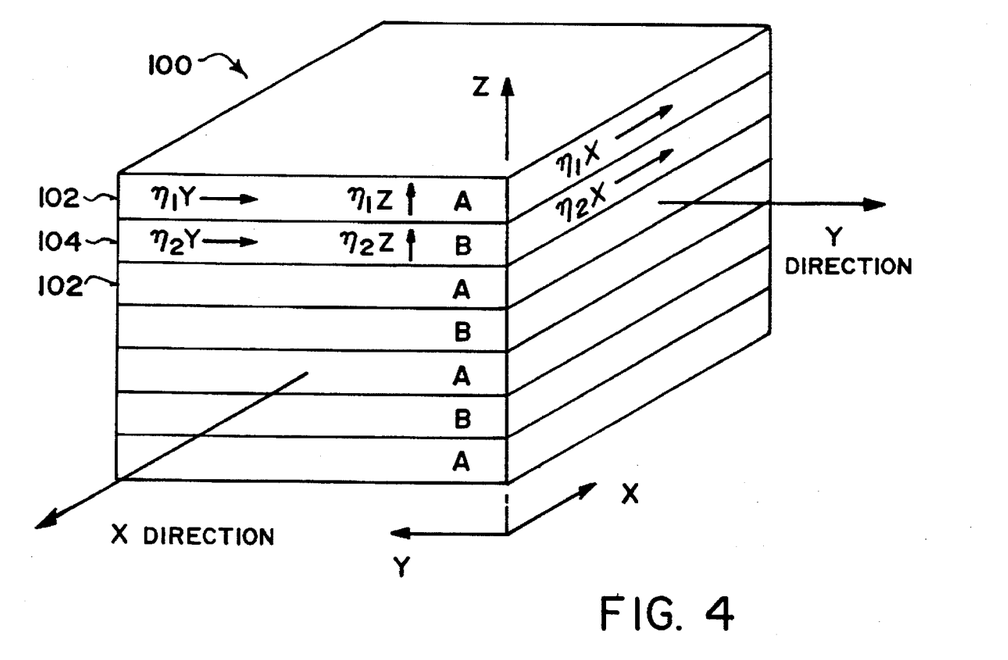
FIG. 4 is a schematic oblique perspective illustration, on a greatly magnified scale, of several layers of a multilayer optical film material formed by alternating layers of at least two different materials.

An exemplary multilayer optical film of the present invention as illustrated in FIG. 4 includes a multilayer stack 100 having alternating layers of at least two materials A and B. At least one of the materials, material A for example, has the property of stress induced birefringence, such that the index of refraction of the material is affected by the stretching process in the direction that the film is stretched. Before stretching, both materials may have the same index of refraction. Stretching the stack in the x-direction, for example, increases the index of refraction of material A in the stretch direction. This uniaxial (one directional) stretching results in a refractive index difference between layers ($\Delta \eta x$) in the stretch direction. This refractive index difference between layers will cause light polarized in the plane defined by the stretch direction (i.e., the x-z plane) to be reflected. If there is no stretching in the y-direction, there is no refractive index difference in the y-direction (i.e., $\Delta \eta y = 0$) and thus light polarized in the y-z plane is transmitted. Stretching in one direction thus results in a multilayer reflecting polarizer.

If the film is biaxially stretched, i.e., stretched in both the x and y directions, a refractive index difference in both directions is created. Thus, light polarized in both the x-z and the y-z planes is reflected. Thus a biaxially stretch multilayer stack acts as mirror. By stretching the multilayer stack over a range of uniaxial to biaxial orientation, a film is created with a range of reflectivities for differently oriented plane-polarized incident light. The multilayer stack can thus be made useful as reflective polarizers, mirrors, or partial mirrors, depending upon the desired end-use application.

To achieve high off-axis reflectivity as well as high reflectivity for light at normal incidence, it has been found that the relationship of the refractive index difference in the z-direction (i.e., $\Delta\eta z$) is very important. Ideally, for both mirrors and polarizers, a z-index match (i.e., the condition $\Delta\eta z=0$) ensures high off angle reflectivity (for both polarizations in the case of mirrors, and for the reflection polarization in the case of polarizers). However, for those polarizers where an exact z-index match is not possible, the y-index difference can be manipulated to ensure that off-angle reflectivity is maximized. In this case, the sign of the y-index difference preferably matches the sign of the z-index difference.

Multilayer optical films as used in conjunction with the present invention exhibit relatively low absorption of incident light, as well as high reflectivity for off axis as well as normal light rays as described above. Multilayer optical films constructed according to the present invention exhibit a Brewster angle (the angle at which reflectance goes to zero for light incident at any of the layer interfaces) which is very large or is nonexistent. In contrast, known multilayer polymer films exhibit relatively small Brewster angles at layer interfaces, resulting in transmission of light and/or undesirable iridescence. The multilayer optical films according to the present invention, however, allow for the construction of mirrors and polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

Referring again to FIG. 4, the multilayer stack 100 can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials.

The preferred multilayer stack is comprised of low/high index pairs of film layers, wherein each low/high index pair of layers has a combined optical thickness of ½ the centre wavelength of the band it is designed to reflect. Stacks of such films are commonly referred to as quarterwave stacks. For multilayer optical films concerned with the visible and the near infrared wavelengths, a quarterwave stack design results in each of the layers in the multilayer stack having an average thickness of not more than 0.5 microns.

In those applications where reflective films (e.g. mirrors) are desired, the desired average transmission for light of each polarization and plane of incidence generally depends upon the intended use of the reflective film. One way to produce a multilayer mirror film is to biaxially stretch a multilayer stack which contains a birefringent material as the high index layer of the low/high index pair. For a high efficiency reflective film, average transmission along each stretch direction at normal incidence over the visible spectrum (400–700 nm) is desirably less than 10% (reflectance greater than 90%), preferably less than 5% (reflectance greater than 95%), more preferably less than 2% (reflectance greater than 98%), and even more preferably less than 1%(reflectance greater than 99%). The average transmission at 60 degrees from the normal from 400–700 nm is desirably less than 20% (reflectance greater than 80%), preferably less than 10% (reflectance greater than 90%), more preferably less than 5% (reflectance greater than 95%), and even more preferably less than 2% (reflectance greater than 98%), and even more preferably less than 1% (reflectance greater than 99%).

In addition, asymmetric reflective films may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400–700 nm), or over the visible spectrum and into the near infrared (e.g., 400–850 nm).

Multilayer optical films can also be designed to operate as reflective polarizers. One way to produce a multilayer reflective polarizer is to uniaxially stretch a multilayer stack. The resulting reflective polarizers have high reflectivity for light with its plane of polarization parallel to one axis(in the stretch direction) for a broad range of angles of incidence, and simultaneously have low reflectivity and high transmissivity for light with its plane of polarization parallel to the other axis (in the non-stretch direction) for a broad range of angles of incidence. By controlling the three indices of refraction of each film, $\eta x$, $\eta y$ and $\eta z$, the desired polarizer behaviour can be obtained.

For many applications, the ideal reflecting polarizer has high reflectance along one axis (the so-called extinction axis) and zero reflectance along the other (the so-called transmission axis), at all angles of incidence. For the transmission axis of a polarizer, it is generally desirable to maximize transmission of light polarized in the direction of the transmission axis over the bandwidth of interest and also over the range of angles of interest.

The average transmission at normal incidence for a polarizer in the transmission axis across the visible spectrum (400–700 nm for a bandwidth of 300 nm) is desirably at least 50%, preferably at least 70%, more preferably at least 85%, and even more preferably at least 90%. The average transmission at 60 degrees from the normal (measured along the transmission axis for p-polarized light) for a polarizer from 400–700 nm is desirably at least 50%, preferably at least 70%, more preferably at least 80%, and even more preferably at least 90%.

The average transmission for a multilayer reflective polarizer at normal incidence for light polarized in the direction of the extinction axis across the visible spectrum (400–700 nm for a bandwidth of 300 nm) is desirably at less than 50%, preferably less than 30%, more preferably less than 15%, and even more preferably less than 5%. The average transmission at 60 degrees from the normal (measured along the transmission axis for p-polarized light) for a polarizer for light polarized in the direction of the extinction axis from 400–700 nm is desirably less than 50%, preferably less than 30%, more preferably less than 15%, and even more preferably less than 5%.

For certain applications, high reflectivity for p-polarized light with its plane of polarization parallel to the transmission axis at off normal angles are preferred. The average reflectivity for light polarized along the transmission axis should be more than 20% at an angle of at least 20 degrees from the normal.

In addition, although reflective polarizing films and asymmetric reflective films are discussed separately herein, it should be understood that two or more of such films could be provided to reflect substantially all light incident on them (provided they are properly oriented with respect to each other to do so). This construction is typically desired when the multilayer optical film is used as a reflector in a backlight system according to the present invention.

If some reflectivity occurs along the transmission axis, the efficiency of the polarizer at off-normal angles may be reduced. If the reflectivity along the transmission axis is different for various wavelengths, colour may be introduced into the transmitted light. One way to measure the colour is to determine the root mean square (RMS) value of the transmissivity at a selected angle or angles over the wavelength range of interest. The % RMS colour, $C_{RMS}$, can be determined according to the equation:

$$C_{RMS} = \frac{\int_{\lambda_1}^{\lambda_2} ((T-\overline{T})^2)^{1/2} d\lambda}{\overline{T}}$$

where the range $\lambda_1$ to $\lambda_2$ is the wavelength range, or bandwidth, of interest, T is the transmissivity along the transmission axis, and $\overline{T}$ is the average transmissivity along the transmission axis in the wavelength range of interest. For applications where a low colour polarizer is desirable, the % RMS colour should be less than 10%, preferably less than 8%, more preferably less than 3.5%, and even more preferably less than 2% at an angle of at least 30 degrees from the normal, preferably at least 45 degrees from the normal, and even more preferably at least 60 degrees from the normal.

Preferably, a reflective polarizer combines the desired % RMS colour along the transmission axis for the particular application with the desired amount of reflectivity along the extinction axis across the bandwidth of interest. For polarizers having a bandwidth in the visible range (400-700 nm, or a bandwidth of 300 nm), average transmission along the extinction axis at normal incidence is desirably less than 40%, more desirably less than 25% preferably less than 15%, more preferably less than 5% and even more preferably less than 3%.

Materials Selection and Processing

With the design considerations described in the above mentioned U.S. patent application Ser. No. 08/402,041, one of ordinary skill will readily appreciate that a wide variety of materials can be used to form multilayer reflective films or polarizers according to the invention when processed under conditions selected to yield the desired refractive index relationships. The desired refractive index relationships can be achieved in a variety of ways,including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co extruded. A detailed description of the materials selection and processing conditions can be found in the above mentioned U.S. patent application Ser. No. 08/402,041, which is incorporated herein by reference.

Light Guides Incorporating Multilayer Optical Film

Currently available prism light guide wall materials are about 98% reflective for incident light rays falling within the material's acceptance angular range, and are highly transmissive for incident light rays falling outside that range. By contrast, multilayer optical film material can be made with higher reflectivity than the best currently available prism light guide wall materials, and in a manner which maintains such higher reflectivity for all incident light angles. Accordingly, multilayer optical film is well suited as a substitute for prism light guide wall material in forming tubular conduits for guiding light from one place to another, provided there is no need to emit light from the conduit.

Figure 5:
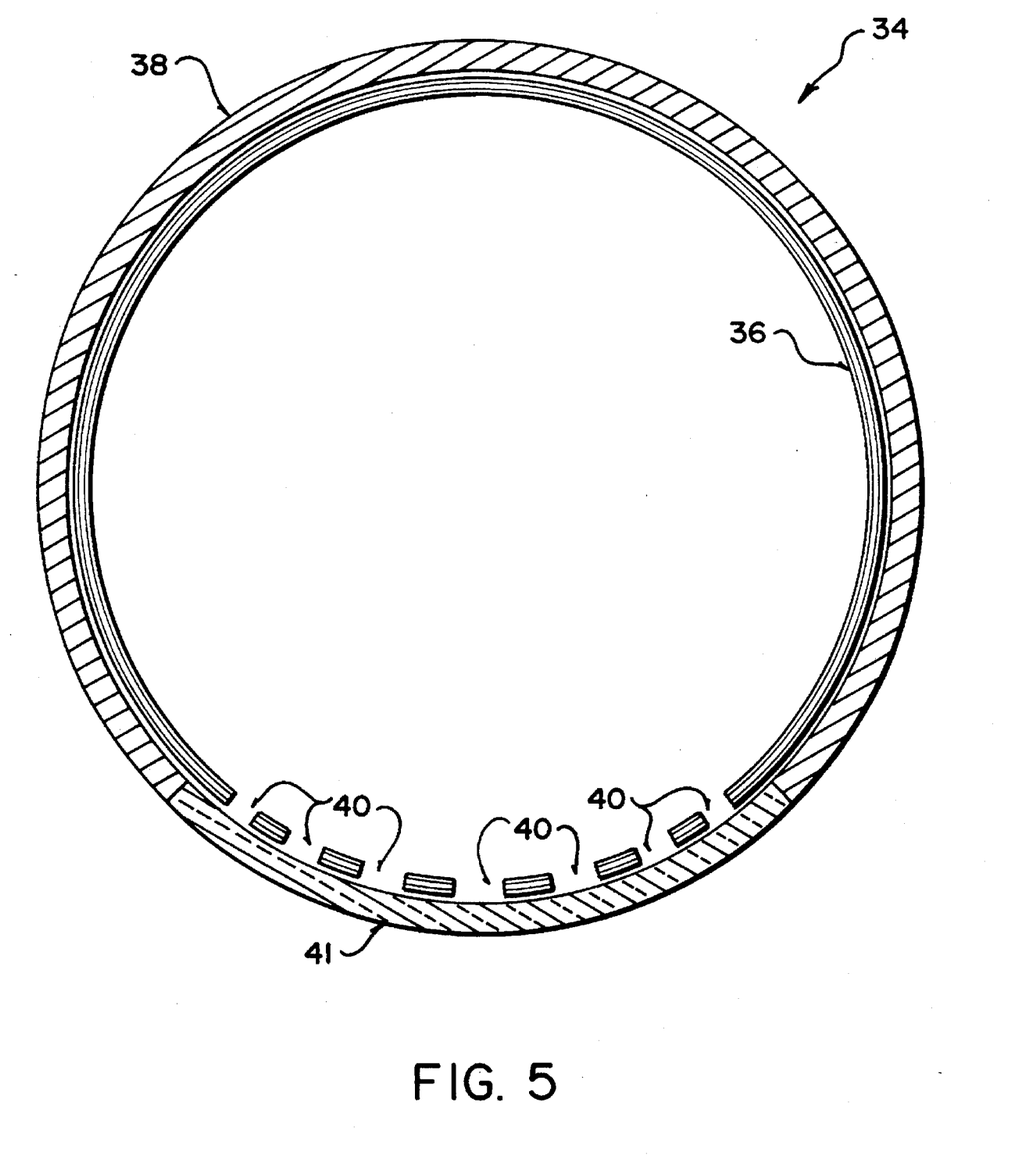
FIGS. 5 and 6 are schematic cross-sectional illustrations of light guides formed of multilayer optical film material in accordance with the invention.

Multilayer optical film can also be used to form light guides from which light can be efficiently extracted. Consider first FIG. 5, which depicts a light guide 34 formed of multilayer optical film in accordance with one possible embodiment of the present invention. Light guide 34 is similar to the FIG. 2 light guide 22, except that prism light guide wall material conduit 30 is replaced by tubular conduit 36 formed of multilayer optical film. White reflector film 28 is not required in guide 34, because virtually no light escapes through the highly reflective multilayer optical film 36 toward opaque cover portion 38. Light extraction holes 40 are provided in multilayer optical film conduit 36 over the region from which light is to be extracted through translucent cover 41.

Although guide 34 affords superior extraction efficiency, it is still subject to some of the basic problems which affect guide 22. In particular, extraction holes 40 detract from the outward appearance of guide 34; and, it is difficult to design and manufacture guide 34 with the required size and/or pattern of extraction holes 40 (which must vary as a function of distance along guide 34 in a manner unique to each specific design). Past experience with light guides embodying the FIG. 2 design therefore suggests that the FIG. 5 design would not be very successful.

Figure 6:
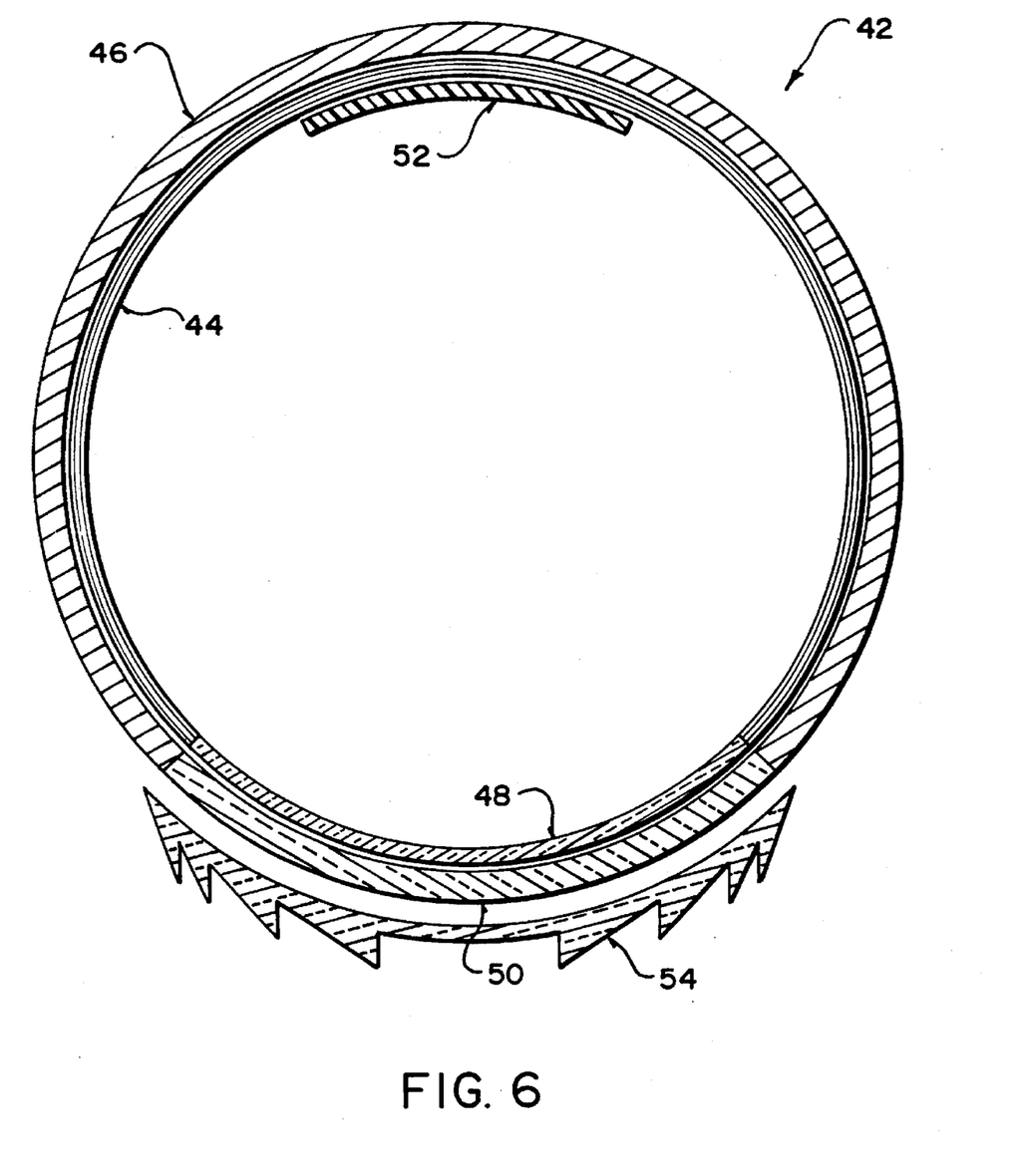

Now consider FIG. 6, which depicts a light guide 42 formed of multilayer optical film in accordance with another (and preferred) embodiment of the present invention. Light guide 42 is similar to the FIG. 1 light guide 10, except that prism light guide wall material conduit 18 is replaced by a hybrid tubular conduit 44 which is formed of multilayer optical film in the region adjacent opaque cover portion 46 and formed of prism light guide wall material 48 in the region adjacent translucent cover portion 50. A section of white extractor film 52 is provided inside conduit 44, near the top portion thereof, to scatter light rays toward prism light guide wall material 48 at angles outside the angular range within which material 48 reflects incident light rays internally within guide 42. Such scattered rays accordingly escape through prism light guide wall material 48 and are emitted through translucent cover portion 50. White reflector film is not required in guide 42, because virtually no light escapes through the highly reflective multilayer optical film 44 toward opaque cover portion 46.

Light guide 42 retains all the advantages of light guide 10, while substantially reducing the problem of extraction efficiency loss, since multilayer optical film 44 reflects light along guide 42 with very low absorption loss. A further advantage is that multilayer optical film 44 can be bonded to opaque cover portion 46. For example, multilayer optical film 44 could be supplied bonded to a sheet metal substrate which could then be formed into the desired light guide shape, with the sheet metal constituting opaque cover portion 46.

Another advantage to such use of multilayer optical film technology is that the maximum aspect ratio of guide 42 will be somewhat increased, due to the higher reflectivity of multilayer optical film 44. Further, the quality of the collimation of the light source is less critical, because multilayer optical film 44 has a wider acceptance angle range.

An important characteristic of multiple layer optical film utilized in a light guide embodying the present invention is that the film be a longitudinally specular light reflector. As used herein, the term "longitudinally specular light reflector" means a material for which the z components of the unit direction vectors of the incident and reflected light rays are substantially the same, where the z direction is parallel to the surface of the material and is the longest direction of the light guide. Those skilled in the art will appreciate that a material which is "longitudinally specular" is not necessarily "specular"; but, that all "specular" materials are also necessarily "longitudinally specular". This distinction is important, as in some cases there may be advantages to the use of longitudinally specular materials which are not specular, such that they cause transverse scattering or some other modification of the transverse motion of the light rays as they travel down the guide. Materials which are "specular" reflect light rays by reversing only the unit direction vector of the incident light ray which is normal to the surface of the reflecting material, with the incident ray's other unit direction vectors remaining unchanged. Materials which are "longitudinally specular" reflect light rays such that only the unit direction vector of the incident light ray which is parallel to the surface of the reflecting material is unchanged, with the possibility that the incident ray's other unit direction vectors may be scattered.

Improved Light Extraction Materials

State of the art materials used to form extractor films 20, 52 absorb about 5% to 10% of the light incident upon them. In particular, absorption losses occur when light is initially scattered by the extractor, with additional absorption losses occurring if the scattered light does not immediately escape from the light guide but is internally reflected such that it is subsequently again scattered by the extractor. The latter effect becomes more significant as distance increases from the light source, since the extractor's width may necessarily be quite large at such distances.

Although this problem has always been present, previously there has not been much motivation to solve it, because it did not have much impact on overall efficiency of the light guide, having regard to the absorption losses of the prism light guide wall material used to form the light guide itself. But, with the introduction of highly reflective multilayer optical film technology, the problem becomes much more significant.

Using the best currently available material (which is about 5% absorptive) to form extractor 52, the extraction efficiency of light guide 42 is about 85%. If extractor 52 is 99.5% reflective, the extraction efficiency rises to 95%. Thus, use of a very high efficiency extractor with multilayer optical film technology makes it possible to combine the outwardly perceptible aesthetic quality of light guide 10 (FIG. 1) with the highly efficient light guide 22 (FIG. 2).

Extractor 52 need not be highly reflective itself, because it can be mounted on the internal surface of highly reflective multilayer optical film 44. Extractor 52 need only be capable of scattering incident light, which can be achieved with a single textured air-polymer interface. All that is required is that the polymer and the mounting adhesive be quite non-absorptive. It is also desirable that the material used to form extractor 52 be easily handled and easily cut by hand and by electronic cutting equipment.

Typically, the cross-section of light guide 42 is substantially constant along the guide. Because the available light decreases as a function of length along light guide 42, extractor 52 is tapered by increasing its width as a function of length along guide 42 in the direction away from the light source. Alternatively, or additionally, the cross-sectional area of the guide itself may be tapered as a function of length along the guide.

A key feature of the invention is that light guide 42 constitutes an optical cavity of high net reflectivity. In particular, if light rays are directed into the light emitting portion of the guide, a very high fraction of those rays will be re-emitted, in stark contrast to previous light guide designs. This feature can be put to advantage by positioning a specialized film "lens" 54 outside light emitting cover portion 50 to distribute the emitted light in a preferred way. The lens preferably has a low light absorption characteristic; and, a light transmissivity characteristic which varies as a function of wavelength, polarization, angle or some combination thereof. In this way the reflected light is recycled by light guide 42 and reused rather than being lost to absorption as in prior art guides.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A light guide, comprising in cross-section:
    (a) a non-light emitting portion comprising multiple layers of:
        (i) a first substantially non-absorptive longitudinally specular light reflector;
        (ii) a second substantially non-absorptive longitudinally specular light reflector;
        each one of said layers having a selected index of refraction which differs from the indices of refraction of layers immediately adjacent said one of said layers, such that said multiple layers collectively have high longitudinally specular reflectivity;
    (b) a light emitting portion comprising prism light guide wall material; and,
    (c) a substantially non-absorptive light scattering means positioned within said non-light emitting portion in opposition to said light emitting portion.

2. A light guide as defined in claim 1, wherein:
    (a) said light guide cross-section is substantially constant along said light guide; and,
    (b) said light scattering means has a width which increases as a function of length along said light guide.

3. A light guide as defined in claim 1, wherein:
    (a) said light guide cross-section decreases as a function of length along said light guide; and,
    (b) said light scattering means has a width which increases as a function of length along said light guide.

4. A light guide as defined in claim 1, further comprising a lens positioned outside said light emitting portion, said lens characterized by:
    (a) low light absorption; and,
    (b) light transmissivity which varies as a function of one or more of:
        (i) wavelength;
        (ii) polarization; and,
        (iii) angle.

5. A light guide as defined in claim 1, further comprising an opaque cover surrounding and bonded to said non-light emitting portion.

6. A light guide as defined in claim 1, wherein said light scattering means comprises a non-absorptive, single textured air-polymer interface bonded to said non-light emitting portion by a non-absorptive adhesive.

7. A light guide as defined in claim 1, wherein each of said layers has a thickness of no more than 0.5 microns.

8. A light guide, comprising in cross-section:
(a) a non-light emitting portion comprising layers of first and second substantially non-absorptive polymers, said first and second polymers differing in composition such that said layers collectively have high longitudinally specular reflectivity;
(b) a light emitting portion comprising prism light guide wall material; and,
(c) a substantially non-absorptive light scattering means positioned within said non-light emitting portion in opposition to said light emitting portion.

9. A light guide as defined in claim 8, wherein:
(a) said light guide cross-section is substantially constant along said light guide; and,
(b) said light scattering means has a width which increases as a function of length along said light guide.

10. A light guide as defined in claim 8, wherein:
(a) said light guide cross-section decreases as a function of length along said light guide; and,
(b) said light scattering means has a width which increases as a function of length along said light guide.

11. A light guide as defined in claim 8, further comprising a lens positioned outside said light emitting portion, said lens characterized by:
(a) low light absorption; and,
(b) light transmissivity which varies as a function of one or more of:
(i) wavelength;
(ii) polarization; and,
(iii) angle.

12. A light guide as defined in claim 8, further comprising an opaque cover surrounding and bonded to said non-light emitting portion.

13. A light guide as defined in claim 8, wherein said light scattering means comprises a non-absorptive, single textured air-polymer interface bonded to said non-light emitting portion by a non-absorptive adhesive.

14. A light guide as defined in claim 8, wherein each of said layers has a thickness of no more than 0.5 microns.

15. A light guide, comprising in cross-section:
(a) a non-light emitting portion comprising multiple layers of:
(i) a first substantially non-absorptive longitudinally specular light reflector;
(ii) a second substantially non-absorptive longitudinally specular light reflector;
each one of said layers having a stress induced birefringence such that said multiple layers are birefringent over a range of uniaxial to biaxial orientation of said layers and such that said multiple layers collectively have high longitudinally specular reflectivity;
(b) a light emitting portion comprising prism light guide wall material; and,
(c) a substantially non-absorptive light scattering means positioned within said non-light emitting portion in opposition to said light emitting portion.

16. A light guide as defined in claim 15, wherein:
(a) said light guide cross-section is substantially constant along said light guide; and,
(b) said light scattering means has a width which increases as a function of length along said light guide.

17. A light guide as defined in claim 15, wherein:
(a) said light guide cross-section decreases as a function of length along said light guide; and,
(b) said light scattering means has a width which increases creases as a function of length along said light guide.

18. A light guide as defined in claim 15, further comprising a lens positioned outside said light emitting portion, said lens characterized by:
(a) low light absorption; and,
(b) light transmissivity which varies as a function of one or more of:
(i) wavelength;
(ii) polarization; and,
(iii) angle.

19. A light guide as defined in claim 15, further comprising an opaque cover surrounding and bonded to said non-light emitting portion.

20. A light guide as defined in claim 15, wherein said light scattering means comprises a non-absorptive, single textured air-polymer interface bonded to said non-light emitting portion by a non-absorptive adhesive.

21. A light guide as defined in claim 15, wherein each of said layers has a thickness of no more than 0.5 microns.

* * * * *